Sept. 22, 1970

D. S. GOODMAN 3,530,422

CONNECTOR AND METHOD FOR ATTACHING SAME TO PRINTED CIRCUIT BOARD

Filed March 25, 1968

2 Sheets-Sheet 1

INVENTOR
DAVID S. GOODMAN
BY Donald M. Sandler
ATTORNEY.

INVENTOR
DAVID S. GOODMAN
BY Donald M Sandler
ATTORNEY

United States Patent Office 3,530,422
Patented Sept. 22, 1970

3,530,422
CONNECTOR AND METHOD FOR ATTACHING SAME TO PRINTED CIRCUIT BOARD

David S. Goodman, Doylestown, Pa., assignor to Elco Corporation, Willow Grove, Pa., a corporation of Delaware Filed Mar. 25, 1968, Ser. No. 715,666
Int. Cl. H01r 9/16; H05k 1/12
U.S. Cl. 339—17 4 Claims

ABSTRACT OF THE DISCLOSURE

A connector comprising contacts twist-locked to an insulator is held to a mother board by means of an interference fit between the tails of the contacts and plated-through holes in the mother board. The tails of the contacts are forced into the plated-through holes by applying pressure to the insulator body.

This invention relates to connectors and a method for attaching the same to a printed circuit board.

A plurality of individual printed circuit boards, referred to as daughter boards, each containing an electronic circuit, often are designed to be mounted perpendicularly to a larger printed circuit board, referred to as a mother board. Flexibility in circuit design, fabrication and ease of maintenance are achieved by designing the daughter boards to plug into card edge connectors (e.g., connectors in which the nose section of the contacts are designed to slideably and resiliently engage conductive pads on an edge of a daughter board). The tails of the contacts of a card edge connector project through the mother board and are usually of rectangular configuration to permit a programmed back panel wiring technique to be used to provide solderless terminations that effect the necessary interconnections between circuits on the individual boards.

It is necessary to attach each connector to the mother board with sufficient holding power to resist dislodgement due to the force exerted on the connector upon withdrawal of a daughter board, as well as G-loading design criterion. If field repairs are contemplated, it is also necessary to provide for removal and replacement of the connectors. The conventional approach has been to attach a card edge connector to a mother board of insulating material using fasteners. Other approaches involve more permanent attachment, such as splaying the tail of each contact to the mother board, soldering the tail to a printed track on the underside of the mother board, or using adhesives. All of these approaches, however, introduce added expense and complexity to large scale production of electronic equipment. It is the primary object of the present invention, therefore, to provide an improved card edge connector which can easily be attached to or removed from a mother board.

These and other objectives are achieved with the present invention by employing connectors in which each contact has a gripping shank which projects from the bottom surface of a thermosetting insulator. Each contact is attached to the insulator by twisting the tail until an upwardly facing shoulder on the gripping shank overlies the bottom surface of the insulator. The cross section of the gripping shank is designed to interfere with a plated through hole in the mother board so that pressure applied to the insulator and transferred to the contact through the upwardly facing shoulder thereon, will force the gripping shank into frictional engagement with the plated through hole. The interference between the gripping shank and the plated through hole is such as to create a frictional force sufficient to retain the contact, and hence the insulator itself, to the mother board. Using this technique, it is not necessary to use additional means such as splaying or soldering the contact tails or using adhesives or fasteners on the insulator. To effect this method of fabrication, the cross-sectional area of the shoulder, where it engages the bottom surface of the insulator, must be sufficient to maintain the compressive stress applied to the insulator by the shoulder upon insertion of the gripping shank into the plated through hole to a value compatible with the material of the insulator.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

The invention is described by way of example with reference to the accompanying drawing, in which.

Figures 1, 3:
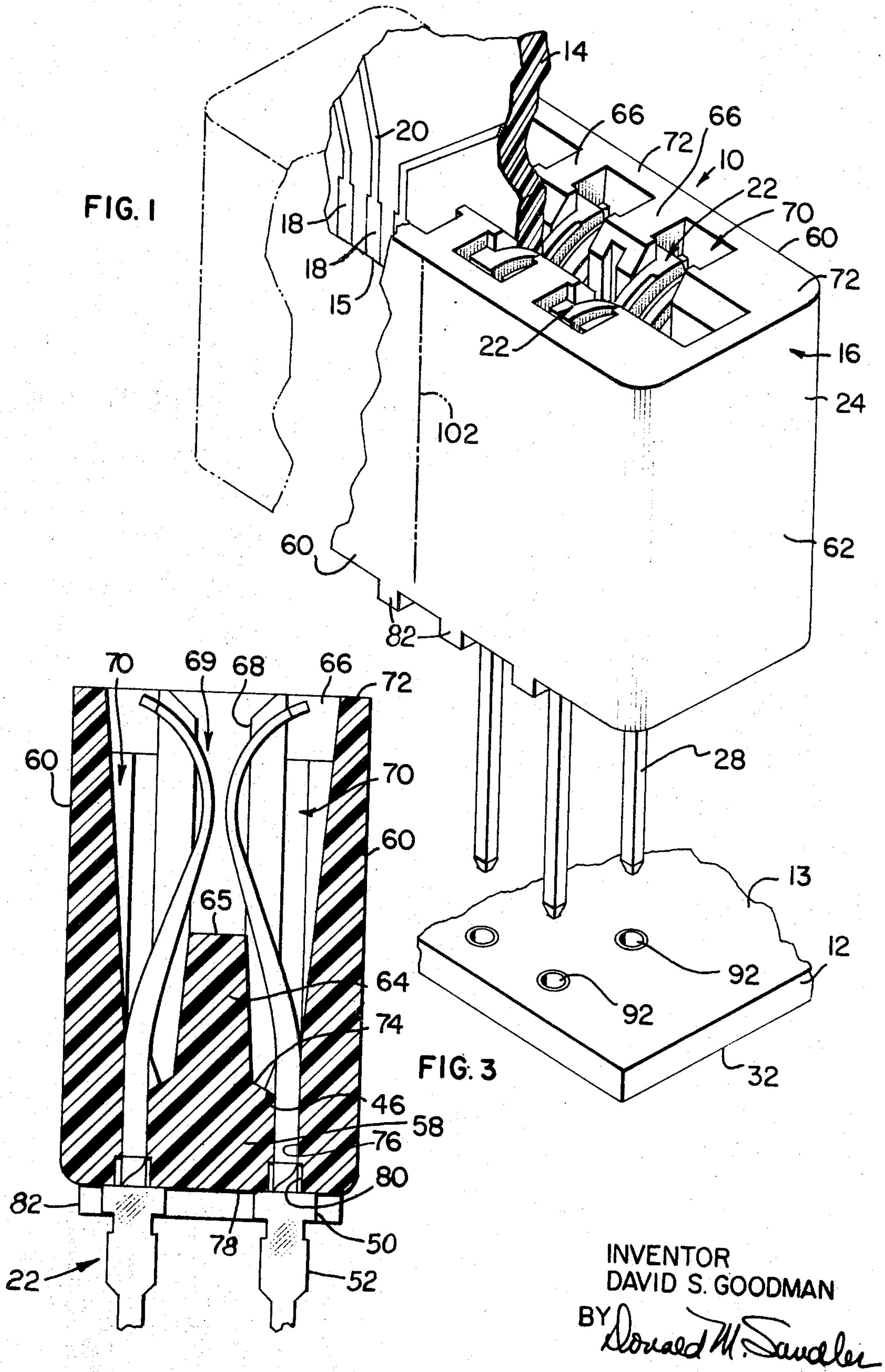
FIG. 1 is a perspective view of a connector made in accordance with the present invention, with portions broken away and shown in phantom for better illustrating the invention, and about to be inserted into a mother board.
FIG. 3 is a sectional view of the connector showing the contacts twisted in place.

Referring now to FIG. 1, reference numeral 10, denotes an assembly comprising mother board 12 and a daughter board 14 (fragmentary view) plugged into card edge connector 16. Connector 16 is designed to be plugged into the front side 13 of board 12. To simplify the drawings, only a portion of board 12 is shown, it being understood that this board is large enough to accommodate a number of connectors like card edge connector 16.

Board 14 is provided along one edge 15 with a plurality of conductive pads 18 connected by means of conductive paths 20 to circuit components (not shown) which are mounted on the board. When pads are provided on opposite sides of board 14, a double row of contacts like that shown generally at 22 is attached to the insulator 24 of connector 16. Whether a single or double row of contacts is provided in the insulator is not important to the present invention.

Figures 2, 2A:
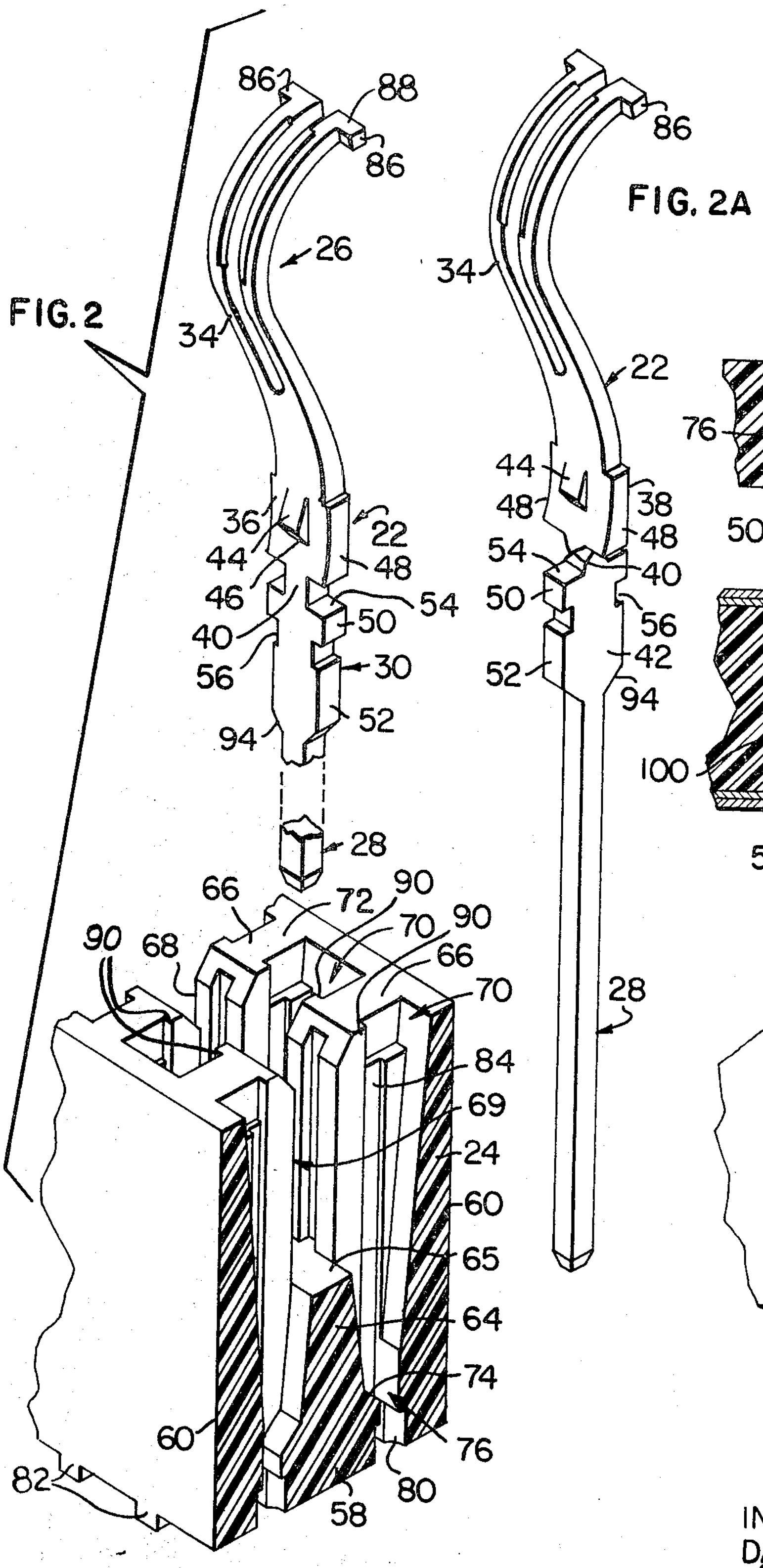
FIG. 2 is a perspective view of a portion of the connector shown in FIG. 1 with a contact about to be inserted thereinto.
FIG. 2A is a perspective view of the contact shown in FIG. 2 with the tail section shown twisted to illustrate the condition of the contact after insertion into the connector and twisting.

As seen in FIG. 2, contact 22 includes nose section 26 interconnected to tail section 28 by body section 30. Nose section 26 is curved to define a cantilever beam that resiliently and slideably engages a pad 18 on board 14 when the latter is plugged into connector 16. In a manner described below, the contacts of connector 16 are attached to the insulator 24 so that tail sections 28 project through board 12 on the back side 32 of the board. Each tail section 28 of the contact is rectangular to permit programmed back panel wiring techniques to be used to provide solderless terminations that effect the necessary interconnections between different circuits on board 14 and between different daughter boards on mother board 12. When the cross section of tail 28 is square, for example, the so called solderless wrapped connections can be used to particular advantage.

The contact is preferably stamped from sheet stock (not shown) of a thickness equal to the minimum dimension of the tail section 28. For example, for a .031 x .031 tail, the stock is .031 inch thick. Referring again to FIG. 2, nose section 26 of contact 22 has a curved, essentially uniformly thick, bifurcated nose 34 that is connected through a tapered transition section 36 to body section 40 which is also uniformly thick and of a dimension greater than nose 34. Both body sections 30 and tail section 28 are of the same thickness, namely, the thickness of the stock from which the contact is stamped. The thickness of nose 34 and the length of transition section 36 are selected to give the nose the required spring characteristics in relation to board 14. The contact shown in FIG. 2 is formed by swaging the nose section 26 to form nose 34 and transition section 36, but the present invention is suitable for contacts formed by other methods of manufacture.

Body section 30 of contact 22 includes upper portion 38 connected by twist portion 40 to lower portion 42. Upper portion 38 is adjacent nose 34 and has stop tab 44 formed by severing a U-shaped section from the upper portion and bending it out of the plane thereof to define a downwardly facing shoulder 46. This configuration of stop-tab is ideally suited for closely spaced contacts. Where the spacing between contacts permits, a stop-tab in the form of a pair of projecting shoulders can be used to advantage. In such case, a downwardly facing shoulder at each longitudinal edge 48 of the contact is thus formed.

Twist portion 40, which is reduced in width from both the upper and lower portions of the body section of the contact, is formed by symmetrically notching each longitudinal edge 48 of contact 22 midway of the body section. Lower portion 42 includes lower stop tab 50 adjacent to portion 40 and gripping shank 52 adjacent tail section 28. Tab 50 has an upwardly facing shoulder 54 and is spaced from gripping shank 52 by relief portion 56 of a width somewhat less than that of the gripping shank. Still referring to FIG. 2, insulator 24 is seen to comprise an elongated base 58 extending the length of the insulator, a pair of spaced side walls 60 on each transverse side of the base, and a pair of spaced end walls 62 (see FIG. 1) at each longitudinal end of the base. Wall 64 runs medially in a longitudinal direction on the base 58, and top 65 of the wall 64 serves as a stop to limit insertion of board 14 into the insulator. A plurality of upstanding transverse walls 66 (notched at 68 to define slot 69 for reception of the edge of board 14) interconnect side walls 60 and medial wall 64. The space between adjacent transverse walls 66, near walls 60, define contact receiving chambers 70 arranged in two rows and aligned with the conductive paths on board 14 so that when a board is inserted into slot 69, there is a path on the board facing each chamber 70.

As seen in FIG. 3, walls 60 in each chamber 70 taper from base 58 toward top 72 of the insulator. Medial wall 64 in each chamber tapers from base 58 toward stop surface 65 in two steps: an initial, rather shallow incline 74 adjacent base 58, and a steeper incline more remote from the base. The inclined nature of these walls facilitate molding of the insulator as well as insertion of the contacts. Incline 74, however, has an additional function. It defines an upper surface in the top of the insulator adjacent hole 76 in base 58 which interconnects chamber 70 with the bottom 78 of the insulator. The region on the bottom 78 surrounding rectangular hole 76 defines a lower surface in the bottom of the insulator. Hole 76 is rectangular and elongated in the longitudinal direction of the insulator. It is of a size to provide a two to three mil clearance in the width direction of the contact, and a one to two mil clearance in the thickness direction of the contact. If desired, the base 58 is counterbored at 80 to provide a partial relief hole for each hole 76. Transverse ribs 82 on the bottom 78 are located between each pair of opposite holes 76 and actually engage the mother board to maintain bottom 78 clear of the board.

The contacts 22 are assembled in insulator 24 tail first as shown in FIG. 2. That is to say, tail section 28 of a contact is inserted from top 72 of the insulator into a contact chamber 70 and into the hole 76 in base 58 at the bottom of the chamber. The contact is oriented so that the bowed nose 34 faces toward slot 69; and the contact is pulled home from the bottom of the insulator. Longitudinal edges 48 of the contact are received in guide slots 84 in walls 66; and by providing a dummy printed circuit board in slot 69 when a contact is inserted as above described, transverse projections 86 on the free end 88 of nose 34 of the contact will seat behind preload shoulders 90 on walls 66 as the contact is pulled home. The cooperation of projections 86 on a contact and shoulders 90 on the insulator insure a predetermined preload on the nose 34 and limit the maximum displacement of the contact into slot 69 in the absence of a printed circuit board therein.

The contact is fully inserted when downwardly facing shoulder 46 on the contact abuts incline 74. In this position, the lower stop tabs 54 clear bottom 78 of the insulator by about 5 mils; and twist portion 40 is entirely contained within hole 76. A 45 degree to 90 degree twist to tail section 28 is then applied by a tool that grasps gripping shank 52 and tab 50. Because portion 40 is smaller than hole 76, and upper portion 38 is held against rotation in guide slots 84, only twist portion 40, lower portion 42 and tail section 28 rotate during twisting.

A 90 degree twist is preferred because in this position, the upwardly facing shoulders 54 are well supported by the lower surface 78 of the insulator. The counterbore 80 prevents collapsing of the material of the insulator immediately adjacent the edge of hole 76 when the insulator is used to press the gripping shanks of the contacts into the plated through holes as described below. After twisting, upwardly facing shoulder 54 overlies bottom 78 of the insulator and the contact is attached to the insulator. In such condition, the gripping shank 52 projects from lower surface 78 of the insulator. The cross sectional configuration of the gripping shank 52 is of importance and will be referred to later.

Turning now to FIG. 1, mother board 12 is provided with a plurality of holes 92 arranged in spaced parallel rows matching the spacing of holes 76 in the insulator. Holes 92 constitute the mounting holes for connector 16 and are plated through in a conventional manner. Conductive paths (such as shown at 20 of FIG. 1) may be provided in board 12 to provide preselected interconnections between holes.

The connector 16 with all the contacts 22 assembled therein is attached to mother board 12 by dropping tail sections 28 of each contact into holes 92 in mother board. Because gripping shank 52 has a cross sectional configuration that provides an interference fit with plated through holes 92, the connector 16 will not seat on front side 13 of the mother board but will be spaced therefrom as the beveled edges 94 leading from the tail of the contact to the gripping shank rest on the top edge of holes 92. Uniform pressure applied to top 72 and top 65 of insulator 24 in direction perpendicular to front side 13 of the mother board causes the lower surface on the bottom of the insulator to engage the upwardly facing shoulders on the stop tabs on the lower portions of the contacts. Continued pressure on the top of the insulator forces the gripping shanks into frictional engagement with the plated through holes in the mother board. The beveled edges 94 of the contacts facilitate the latter operation which continues until ribs 82 on the insulator abut front side 13 on the mother board. The interference fit between gripping shank and the plated through holes is selected to give the desired degree of retention of the connector to the mother board.

Figure 4:
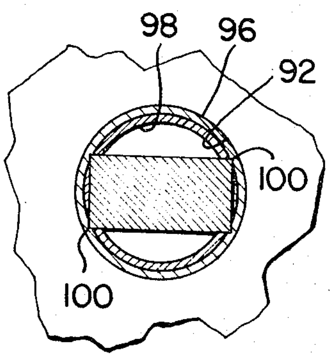
FIG. 4 is a sectional view taken through the gripping shank of a contact when the connector is mounted to a printed circuit board.

Holes 92 may be plated through by any standard process. In one such process, the holes in the mother board are first plated with copper to produce inner layer 96 (see FIG. 4) and are then plated with a 60/40 tin lead composition to produce outer layer 98. The total plated wall thickness should be no less than .002 inch and preferably about .003 inch with a tolerance of ±.00015 inch. Successful results are obtained with a plating process that deposits copper to a thickness in the range .0015 to .0025 inch, and a tin/lead composition to a thickness in the range .0005 to .00015 inch. Successful results have also been obtained for a nickel-based plating compound. Other compounds could also be used. Plated walls thicker than .003 inch do not appear to materially affect the push-in and push-out characteristics of the connector. To limit compressive stresses applied to the insulator when it is attached to the mother board as described above, and to reduce the work required to initially attach the connector and to effect field replacement, it is desirable to limit the maximum push-in force to less than 100 pounds and to insure that the minimum pull-out force is greater than about 20 pounds.

Plated wall thicknesses less than .002 inch are less than about half the preferred minimum interference fit between the gripping shank and the plated through hole with the result that the edges of the gripping shank of a contact dig into the material of the mother board when the connector is attached thereto. Generally ,the frictional resistance offered by the material of the mother board exceeds that offered by the copper/tin/lead plating with result that both the push-in and pull-out characteristics of the connector are increased beyond the optimum range.

The interference fit between the gripping shank and the plated through-hole should be in the range .005 to .012 inch, and preferably in the range from .006 to .011 inch. As used herein "interference fit" means the difference between the diagonal of the gripping shank of the contact and the diameter of the hole after plating, it being understood that the thickness of the contact lies in the range .025 to .045 inch (nominal). An interference fit in the preferred range gives rise to the desired push-in and pull-out characteristics. In addition to this, such interference fit achieves a low resistance electrical connection with the plated through hole. For example, the contact-to-plated-through-hole resistance will be on the average of 0.2 milliohm, and will be gas tight.

The cross section of the upwardly facing shoulders 54 on stop tab 50 determine the unit pressure exerted on the bottom of the insulator during the operation that seats the connector on the mother board. This cross section must be selected so that the compressive stresses exerted on the insulator do not damage the insulator. The minimum area of engagement between the cross-section of the upwardly facing shoulders and the insulator should be about .0022 square inch. The preferred material for the insulator are thermosetting materials like glass fiber reinforced diallyl phthalate and glass fiber reinforced phenolic.

The length of the gripping shank is functionally related to the thickness of the mother board. Basically, it is the area of engagement between the diagonals of longitudinal edges 100 of the gripping shank and the plating in the plated through hole that determines the push-in and push-out characteristics of the contact. As a practical matter, the length of the gripping shank should be about two-thirds of the thickness of the printed circuit board.

Figure 5:
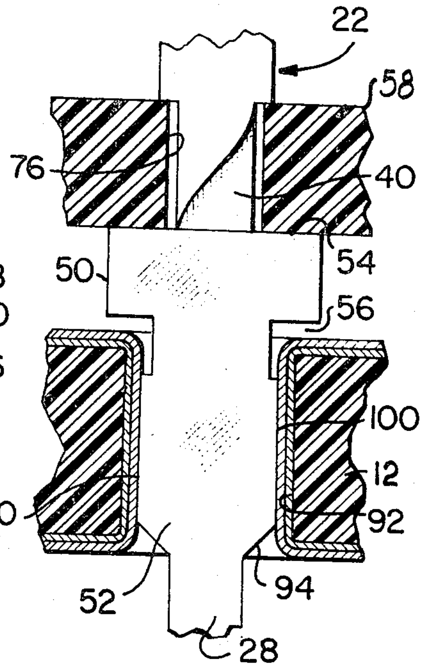
FIG. 5 is an elevation showing a contact mounted in a plated through hole.

This being the case, the gripping shank should be located centrally in the hole in the printed circuit board in order to equally distribute the stresses imparted to the board by the interference fit. Relief portion 56 is of a length sufficient to achieve this purpose as shown in FIG. 5, wherein the gripping shank is seen to terminate within the printed circuit board short of the back side 32 of the board.

While a unitary connector is shown in the drawings, it should be understood that the invention can be adapted to modular blocks by which a complete connector is assembled from a plurality of aligned modular blocks. This concept is illustrated schematically by broken lines 102 shown in FIG. 2. In using this approach, each modular block would comprise an insulator containing, for example, three pairs of contacts; and the insulator configuration could comprise interior blocks and end blocks.

What is claimed is:

1. A process for attaching a connector to a motherboard having a plated-through hole, said connector comprising (1) an insulator body having a bottom surface, a top surface, and a hole therethrough interconnecting said top and bottom surfaces, and (2) a contact having a nose section, a tail section, and a body section interconnecting said nose and tail sections, said body section having an upper portion, a lower portion, and an intermediate portion which has a reduced cross section in relation to that of said lower and upper portions, said lower portion having upwardly-facing shoulders, said contact being positioned in said hole in said insulator with said lower portion of said body section and said tail section projecting from said bottom surface of said insulator, said lower portion of said body section and said tail section being twisted relative to said upper portion of said body section and said nose section so that said upwardly facing shoulders on said lower portion contact said bottom surface of said insulator to restrain said contact from upward movement through said insulator, said lower portion of said body section having a gripping shank of greater cross-sectional area than said tail section, said gripping shank being connected to said tail section by a tapered portion, said gripping shank having parallel surfaces on opposite sides thereof with a sufficient dimension therebetween to establish an interference fit and electrical connection with said plated-through hole in said motherboard sufficient to eliminate the need to use additional mechanical or electrical means to attach said contact to said motherboard, said method including the steps of:

inserting said tail section of said contact into said plated-through hole in said motherboard, and thereafter applying sufficient downward pressure to said insulator to cause said parallel surfaces of said gripping shank to be forced into interfering relationship with said plated-through hole due to force applied from said bottom surface of said insulator to said upwardly facing shoulders on said lower portion of said body section of said contact.

2. A connector for attachment to a motherboard having a hole therethrough, comprising:

an insulator body having a top surface, a bottom surface, and a hole therethrough connecting said top and bottom surfaces, a contact having a nose section, a tail section, and a body section which interconnects said nose and tail sections, said body section having an upper portion, a lower portion, and a portion which has a reduced cross section in relation to that of said lower and upper portions, said lower portion having upwardly facing shoulders, said lower portion having a gripping shank of greater cross-sectional area than said tail section, said gripping shank being connected to said tail section by a tapered portion, said gripping shank having parallel surfaces on opposite sides thereof with a sufficient dimension therebetween to establish an interference fit with said hole in the mother board, said contact being positioned in said hole in said insulator with said lower portion of said body section and said tail section projecting from said lower surface of said insulator, said lower portion of said body and said tail section being twisted relative to said upper portion of said body section and said nose section so that said upwardly facing shoulders on said lower portion contact said lower surface of said insulator to retain said contact from upward movement through said insulator, the area of said upwardly facing shoulders in contact with said lower surface of said insulator being sufficient to permit, without damage to said insulator, a downward force applied to said insulator to drive said gripping shank on the lower portion of said body section into a sufficient interference fit with said hole in the motherboard such that no additional mechanical means are needed to attach said contact and said insulator to the motherboard.

3. The connector of claim 2 wherein said gripping shank is rectangular in cross section.

4. The connector of claim 2 wherein said gripping shank is dimensioned to produce an interference fit with said hole in the motherboard in the range of from .005 to .012 inch.

References Cited

UNITED STATES PATENTS

| | | | |
|---|---|---|---|
| 2,782,392 | 2/1957 | Stolle | 339—220 |
| 2,811,702 | 10/1957 | Narozny | 339—220 |
| 3,059,152 | 10/1962 | Khouri. | |
| 3,223,960 | 12/1965 | Ruehlemann | 339—221 |
| 3,230,493 | 1/1966 | Jensen et al. | |
| 3,233,034 | 2/1966 | Grabbe. | |
| 3,300,686 | 1/1967 | Johnson et al. | 339—17 |
| 3,348,191 | 10/1967 | Kinkaid | 339—220 XR |
| 2,995,617 | 8/1961 | Maximoff et al. | 339—220 |

FOREIGN PATENTS

| | | |
|---|---|---|
| 1,214,047 | 11/1959 | France. |

STEPHEN J. NOVOSAD, Primary Examiner

P. A. CLIFFORD, Assistant Examiner

U.S. Cl. X.R.

339—176, 220; 317—101; 29—626